(12) United States Patent
Choi et al.

(10) Patent No.: US 7,612,672 B2
(45) Date of Patent: Nov. 3, 2009

(54) QUERY TREE BASED TAG IDENTIFICATION METHOD IN RFID SYSTEMS

(75) Inventors: Ji Hwan Choi, Seoul (KR); Hyuckjae Lee, Daejeon (KR); Dongwook Lee, Gyeongsangbuk-do (KR); Hyunseok Lee, Daegu (KR); Youngwoo Youn, Jeollanam-do (KR); Jungeun Kim, Seoul (KR)

(73) Assignee: Research and Industrial Cooperation Group, Daejeon (KR)

( * ) Notice: Subject to any disclaimer, the term of this patent is extended or adjusted under 35 U.S.C. 154(b) by 311 days.

(21) Appl. No.: 11/641,839

(22) Filed: Dec. 20, 2006

(65) Prior Publication Data
US 2008/0106383 A1 May 8, 2008

(30) Foreign Application Priority Data
Oct. 19, 2006 (KR) ...................... 10-2006-0101847

(51) Int. Cl.
*G08B 13/14* (2006.01)
(52) U.S. Cl. .............................. 340/572.1; 340/825.49; 340/10.1
(58) Field of Classification Search ... 340/572.1–572.9, 340/568.1, 540, 10.1, 10.31, 825.02, 825.56, 340/10.51, 825.34, 825.49, 10.4
See application file for complete search history.

(56) References Cited

U.S. PATENT DOCUMENTS

| 5,339,073 | A | 8/1994 | Dodd et al. | |
|---|---|---|---|---|
| 6,727,803 | B2 * | 4/2004 | Hulvey | 340/10.31 |
| 6,970,070 | B2 * | 11/2005 | Juels et al. | 340/10.1 |
| 7,009,526 | B2 * | 3/2006 | Hughes et al. | 340/825.49 |
| 7,075,436 | B2 * | 7/2006 | Shanks et al. | 340/572.1 |
| 7,174,328 | B2 * | 2/2007 | Stanoi et al. | 707/3 |
| 2002/0180587 | A1 | 12/2002 | Stegmaier et al. | |
| 2005/0024186 | A1 * | 2/2005 | Friedrich | 340/10.31 |
| 2006/0273881 | A1 * | 12/2006 | Yang et al. | 340/10.2 |
| 2007/0075836 | A1 * | 4/2007 | Lieffort et al. | 340/10.1 |

FOREIGN PATENT DOCUMENTS

DE 103 49 647 6/2005

OTHER PUBLICATIONS

Finkenzeller et al: "RFID-Handbuch" RFID Handbook:Grundlagen und Parktische Anwendungen, pp. 203-224, XP002341283, Sep. 26, 2002.

* cited by examiner

*Primary Examiner*—Benjamin C Lee
*Assistant Examiner*—Daniel Previl
(74) *Attorney, Agent, or Firm*—Bacon & Thomas, PLLC

(57) ABSTRACT

A query tree based tag identification method in RFID systems includes: (a) forming a temporary ID for each of the tags; (b) comparing an inquiry of the reader with a portion of the temporary ID in each tag when receiving the inquiry from the reader; (c) if the inquiry and the portion of the temporary ID are identical to each other, transmitting a remainder of the temporary ID in each tag to the reader; (d) if a collision occurs in the step (c), generating new inquiries for storing them in the reader; (e) if there is no collision in the step (c), transmitting an ACK signal to each tag whose temporary ID is identified to receive its real tag ID therefrom; and (f) repeating the steps (b) to (e) until there is no inquiry in the reader.

7 Claims, 8 Drawing Sheets

QUERY TREE BASED TAG IDENTIFICATION METHOD IN RFID SYSTEMS

FIELD OF THE INVENTION

The present invention relates to a tag identification method on a query tree basis in RFID systems; and, more particularly, to a tag identification method on a query tree basis in RFID systems capable of identifying tags according to temporary IDs corresponding to the respective tags generated by anti-collision protocols.

BACKGROUND OF THE INVENTION

As well known, RFID (Radio Frequency Identification) is one of automatic identification methods such as a barcode, a magnetic sensor, an IC card and the like; and means a technology used for wirelessly identifying data stored in a tag's microchip by using an ultra-short wave or a long wave.

Such RFID is regarded as a substitute technology for the barcode which is currently used in distribution and circulation fields and financial services. The RFID has advantages in that there is no need of an extra identification process such as contact required in a conventional barcode method in order to achieve tag information or a reader scan in a visibility range and in that huge amounts of data can be sent.

However, since the RFID has problems with the reliability of the identified data and the delay of the technology standardization, researches on anti-collision protocols have been required to improve the characteristics of a read rate and an identification speed.

Meanwhile, there are generally two types of collisions: reader collisions and tag collisions. The reader collisions indicate that a plurality of readers requests inquiries to one tag concurrently, so it is confusing for the tag to identify the inquiries. On the contrary, the tag collisions indicate that a plurality of the tags responds to one reader's inquiry simultaneously and therefore the reader cannot identify any tag. The reader collisions can be easily solved because the readers in RFID systems detect the collisions and communicate with other readers, and therefore, the anti-collision protocols in the existing Mac layers are easily applicable to such situation. However, in case of the tag collisions, the tags which are currently used or which will be used in the large scale distribution and circulation fields are low-cost passive tags, resulting in some restrictions such as complexity of calculating, and cost increase by the memory size and the battery installation when applying usable anti-collision protocols thereto.

RFID tag anti-collision protocols proposed up to now to solve the tag collisions can be grouped into deterministic methods and probabilistic methods. The deterministic methods, which are on the basis of tree based protocols, guarantee a 100% read rate and enable low-power consumption. The tree based protocols identify tags by constructing binary trees through the use of binary bits of tag IDs and then by circulating the nodes of the trees. The tree based protocols have the characteristics capable of predicting the tag identification process. Further, the tags in the tree based protocols simultaneously start transmission with synchronous timing, and, on the other hand, the readers recognize the case that both '0' and '1' are included in the received values as a collision and then split the trees.

Such deterministic methods can be classified into a memory based algorithm and a memoryless based algorithm. In the memory based algorithm, which can be grouped into a splitting tree algorithm and a bit-arbitration algorithm, the reader's inquiries and the responses of the tags are stored and managed in the tag memory, thereby causing an equipment cost increase.

In contrast, in the memoryless based algorithm, the responses of the tags are not determined by the reader's previous inquiries, the tags' responses and the reader's present inquiries, but determined only by the present reader's inquiries so that the cost for the tags can be minimized. As an example, there are a binary tree working algorithm, a query tree algorithm and a collision tracking tree algorithm.

Meanwhile, the probabilistic methods are based on slotted ALOHA based protocols which do not guarantee a 100% read rate but reduce the probability of tag collisions occurring. To improve the performance, there has been suggested a frame slotted ALOHA based anti-collision algorithm wherein frames, each being formed of predetermined N slots, are used for the communications between the readers and the tags; and each tag in the interrogation zone arbitrarily selects a slot for transmitting the tag's information and loads the corresponding IDs therein.

In this algorithm, it is regarded as a collision that several tags select one slot and load each ID therein to send concurrently, but the rate of duplicated selection can be reduced by increasing the slots. However, the increase of the slots in each frame causes the increase of frame transmitting time. In spite of this contradiction, it is difficult to calculate the number of the identification objects, i.e., tags, accurately, so the appropriate number of slots required to each frame and the end point are calculated depending on the probabilistic methods. Thus, the ALOHA based anti-collision algorithm has problems in that it cannot provide the complete tag identification; and high efficiency in the tag identification cannot be expected because the slots where collisions occurred are retransmitted.

The probabilistic methods can be classified into an ID-slot algorithm and a bit-slot algorithm. The ID-slot algorithm transmits each slot where the tag ID is loaded, whereas the bit-slot algorithm transmits each slot where the information composed of specific bits for each tag is loaded to the reader and sequentially responds pursuant to the reader's call. As a representative algorithm of the ID-slot algorithm, there is an I-code algorithm, while there is an anti-collision algorithm using a bit-slot mechanism as the bit-slot algorithm.

According to the suggestion of EPC global, the binary tree working algorithm is adopted in Class 0, the query tree algorithm is adopted in Class 1, the deterministic frame slotted ALOHA algorithm is adopted in Class 1 Gen. 2 proposed to ISO/IEC 18000-6C of the International Standard Organization, and the deterministic frame slotted ALOHA algorithm being formed by adding advantages of the bit-slot algorithm to the frame slotted ALOHA based anti-collision algorithm.

In the conventional algorithms as described above, since the deterministic methods take advantages of the 100% read rate, the low-power consumption and the predictable identification process than the probabilistic methods, the deterministic methods are suitable for the reliability and for overcoming the restrictions. Accordingly, the present invention focuses on the performance enhancement of the deterministic methods for fast identification of numerous tags.

The performance of these deterministic methods has been improved from the binary tree working algorithm to the query tree algorithm and from the query tree algorithm to the collision detection algorithm. Moreover, the improvement of the algorithm for the performance enhancement is focused on how to manage the responses of the tags. In other words, in order to improve the performance of the binary tree working algorithm where only $(k+1)_{th}$ bit of the tag ID responds to the reader's inquiry of k bits, the query tree algorithm make the $(k+1)_{th}$ bit to the end bit of the tag ID respond to the reader's inquiry so one tag ID can be identified directly if there is no collision.

Furthermore, if there is a collision in the query tree algorithm, the trees are split as in the binary tree working algorithm and retransmitted after increasing one bit to the inquiry, thereby causing the waste of the time. In order to reduce the waste of the time, in the collision detection algorithm, when the reader detects the collision while observing the responses of the tags, it transmits a signal to the tags to stop the transmission and puts the received signal into the inquiries to perform identification processes.

According to such algorithms, the performance thereof can be enhanced by taking benefit while processing the responses of the tags. However, since the tag should be able to receive an ACK signal when there occurs a collision during transmission of its ID in case of a collision detection algorithm with best performance, there is a problem that the tags should be able to support both the transmission and reception at the same time, thereby making it difficult to apply to low-cost passive RFID systems. Accordingly, the query tree algorithm, adopted at present as the anti-collision protocol in EPC Class 1, may be a limitation to the tree based anti-collision protocol which can be implemented.

Moreover, in case of DFS-ALOHA (Dynamic Frame-Slotted ALOHA) adopted in EPC Class 1 Gen. 2 which is recognized as EPC Class 2, by using a technique for dynamically allocating the frame size according to the number of tags, it is prevented that the performance is rapidly degraded as the number of the tags increases.

Figure 1:
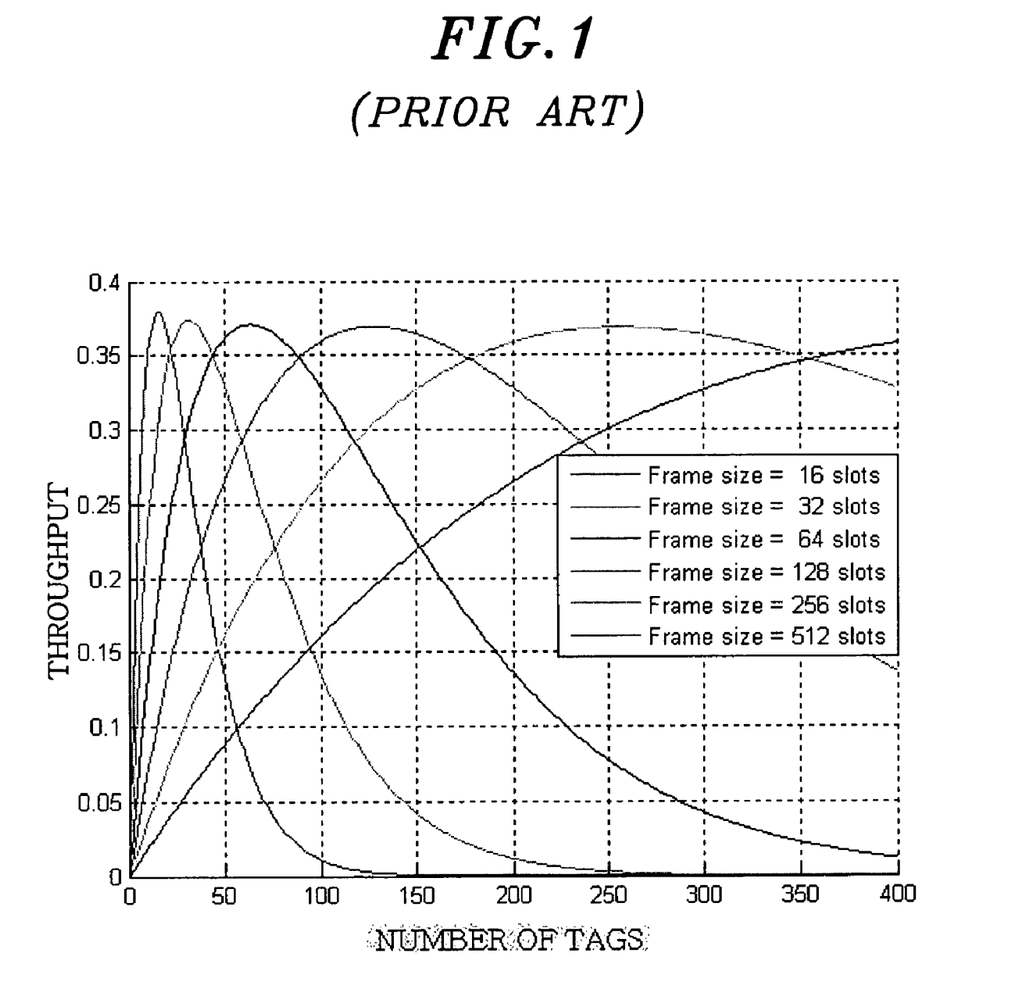
FIG. 1 describes the throughput according to the number of tags of a conventional frame slotted ALOHA with respect to the frame size.
Figure 2:
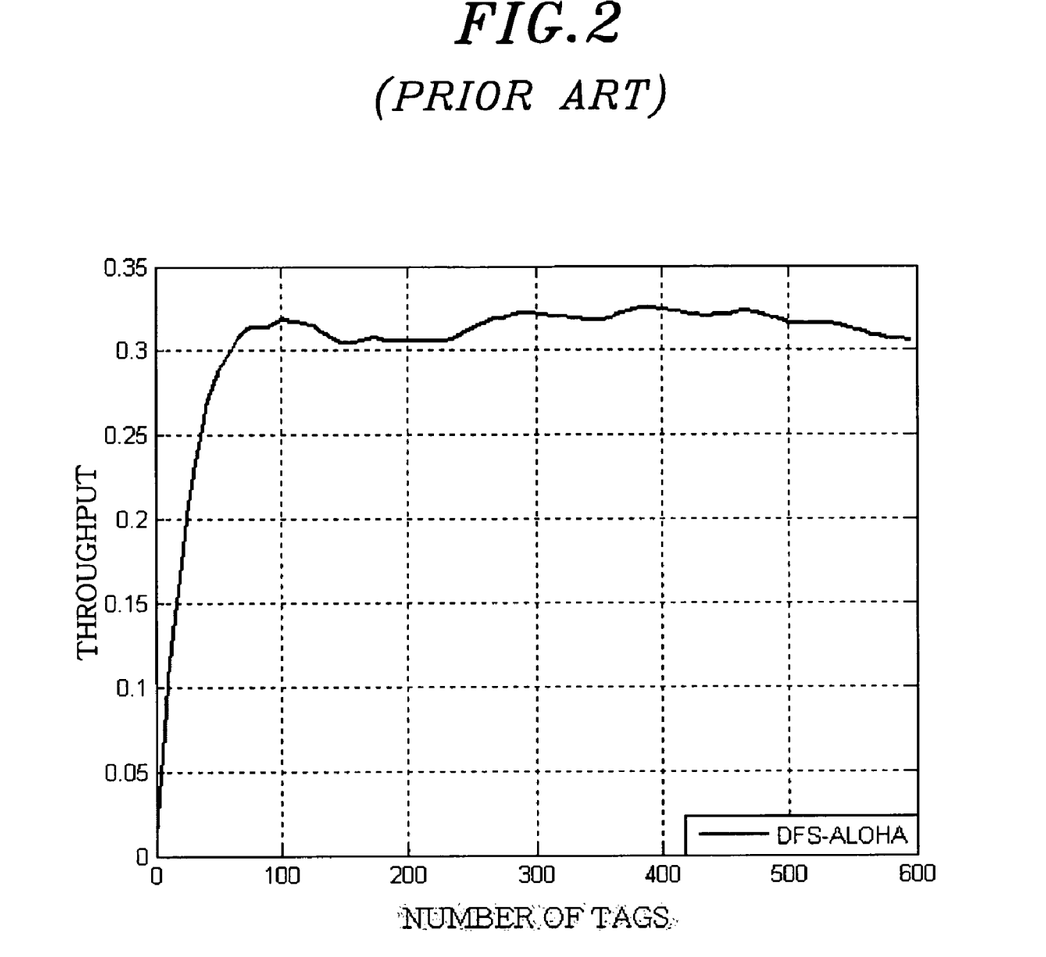
FIG. 2 illustrates the throughput according to the number of tags of a conventional dynamic frame-slotted ALOHA.

However, this cannot solve the performance limit of ALOHA in itself, so there is still a limitation that the throughput is determined to be approximately 35%. For example, FIG. 1 describes the throughput according to the number of tags of the conventional frame slotted ALOHA with respect to the frame size; and FIG. 2 illustrates the throughput according to the number of tags of the conventional dynamic frame-slotted ALOHA.

Consequently, the RFID systems capable of fast identification are required by suggesting tag anti-collision protocols with enhanced performance capable of being implemented by mixing the characteristics of the aforementioned protocols with a limit.

In particular, one of the problems in the RFID systems is how fast to collect the tag IDs. According to the research results, the tree based and ALOHA based anti-collision protocols are somewhat effective. However, the time delay occurs in practical application due to the operation processing time in the tags and readers, and thus it is required to improve the performance of the anti-collision protocols for the faster tag identification. Furthermore, since the performance of the ALOHA based anti-collision protocols is rapidly degraded as the number of the tags increases; and a 100% read rate cannot be guaranteed by the algorithm characteristics of the ALOHA itself, the faster and more efficient tag identification capability is required in the RFID systems by improving the performance of the tree based anti-collision protocols.

Further, despite the collision detection algorithm shows the best performance among the current tree based RFID tag anti-collision algorithms, it cannot be applied to the low-cost passive RFID systems in that the tags should be able to perform both the transmission and reception at the same time in case that a collision occurs. Besides, the dynamic frame-slotted ALOHA adopted in the most recent standard ISO/IEC 18000-6C, i.e., EPC Class 1 Gen. 2 protocol, does not solve the throughput limitation of the ALOHA in itself.

SUMMARY OF THE INVENTION

It is, therefore, an object of the present invention to provide RFID tag anti-collision protocols capable of fast tag identification by applying the characteristics of the dynamic frame-slotted ALOHA algorithm adopted in EPC Class 1 Gen. 2 protocol which is based on ALOHA.

Another object of the present invention is to provide a tag identification method in the RFID systems capable of additionally using processes for the security and authentication supported by EPC Class 1 Gen. 2 protocol.

In accordance with a preferred embodiment of the present invention, there is provided a query tree based tag identification method in RFID systems including a reader and a plurality of tags, the method includes the steps of:

(a) forming a temporary ID for each of the tags;

(b) comparing an inquiry of the reader with a portion of the temporary ID in each tag when receiving the inquiry from the reader;

(c) if the inquiry and the portion of the temporary ID are identical to each other, transmitting a remainder of the temporary ID in each tag to the reader;

(d) if a collision occurs in the step (c), generating new inquiries for storing them in the reader;

(e) if there is no collision in the step (c), transmitting an ACK signal to each tag whose temporary ID is identified to receive its real tag ID therefrom; and (f) repeating the steps (b) to (e) until there is no inquiry in the reader.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings so that they can be readily implemented by those skilled in the art.

Figure 3:
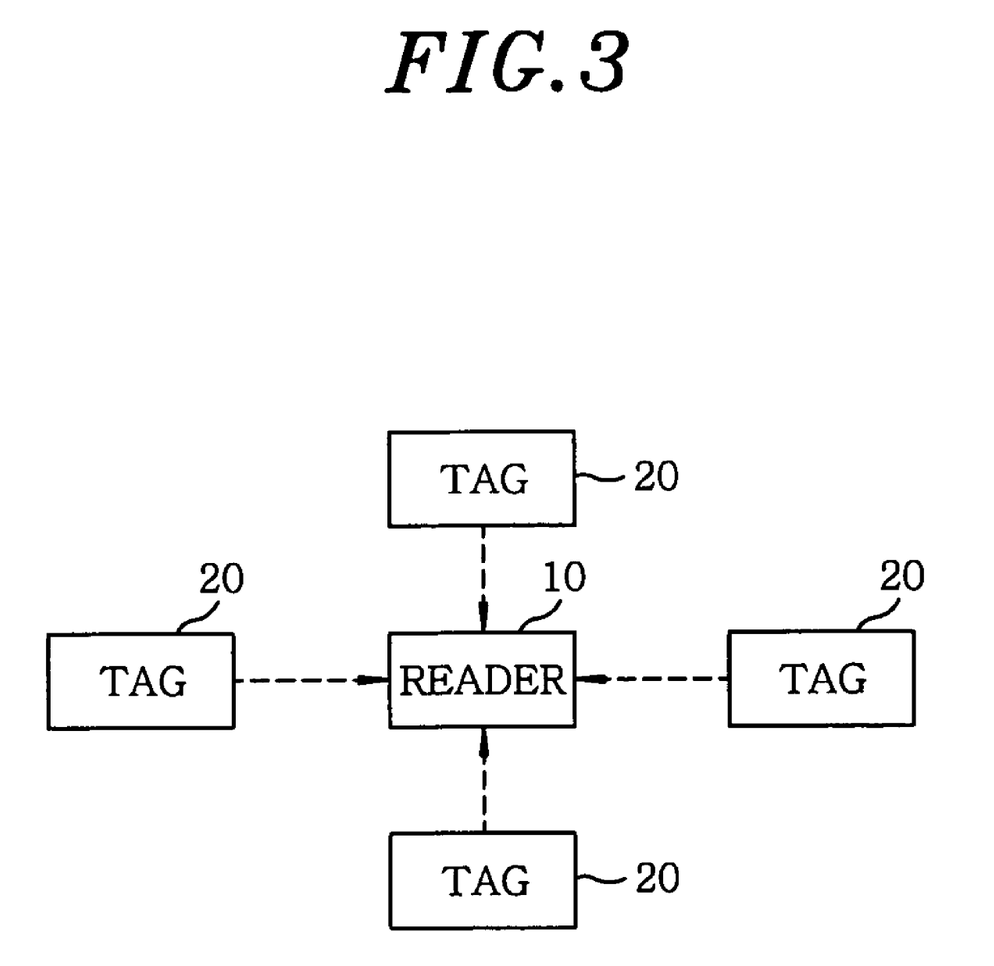
FIG. 3 shows a schematic diagram of a RFID system suitable for performing fast tag identification through RFID tag anti-collision protocols in accordance with the present invention.

FIG. 3 shows a schematic diagram of a RFID system suitable for performing fast tag identification through RFID tag anti-collision protocols in accordance with the present invention.

The RFID system described in FIG. 3 includes a reader 10 and one or more tags 20. The RFID is a technology capable of reading information of tags through RF waves after attaching the tags to objects. This technology can be applied to various fields such as distribution management, security, circulation and the like. By changing an existing contact barcode into RF, it cannot only read the information faster than the barcode but also has the advantage that the restriction of the operation range is alleviated. Further, it takes an additional advantage of intelligentization of objects.

In ubiquitous computing environments, a large number of the tags 20 belong to one reader 10; and there inevitably occur collisions among the information of a plurality of the tags 20 due to synchronism and density thereof. That is, in case that there are several tags 20 within a readable range of one reader 10, the several tags 20 simultaneously respond to the call of the reader 10. At this time, signals of the several tags 20 are interfered with each other, resulting in collisions.

Therefore, it is required to provide a method for identifying the responses of the tags without collisions by solving the interference among the responding signals of such tags 20, which is referred to as an anti-collision protocol (or an anti-collision algorithm).

The aforementioned tag identification method using the RFID systems is called a query tree based reservation or RN16QTA (16-bit random number based query tree algorithm).

The collision detection algorithm in accordance with the present invention will now be described in detail.

According to the present invention, by using the characteristics of the tree based and ALOHA based tag anti-collision protocols suggested in EPC global, i.e., applying the characteristics of the dynamic frame-slotted ALOHA algorithm to the query tree algorithm, it can be achieved a fast tag identification. For this, in order to decrease the tree depth which has the greatest effects on the performance of the tree based anti-collision algorithm, each tag generates a temporary ID as in EPC Class 1 Gen. 2 protocol; and the query tree algorithm performs a reservation process to transmit each tag ID based on the temporary ID. To be specific, the tree whose depth is 16 is constructed by using the 16-bit temporary IDs; and the temporary ID identification process is performed by using the query tree algorithm. Here, since one temporary ID is representative of one tag in its uniqueness, by using this characteristic, an ACK signal is sent whenever the temporary ID is identified so that the tag sends back its ID.

However, the ACK signal at this point is received by the tag after the tag completes the transmission of the temporary ID, which is different in case of the collision detection algorithm but the same in case of EPC Class 1 Gen. 2 protocol. On the other hand, since the present invention uses the query tree based reservation other than slot allocation within frames in EPC Class 1. Gen. 2 protocol, the effects of the time wasted by collisions and empty slots can be removed. All tags located within the readable range of the reader are identified by checking all trees according to the above-mentioned methods.

Figure 4:
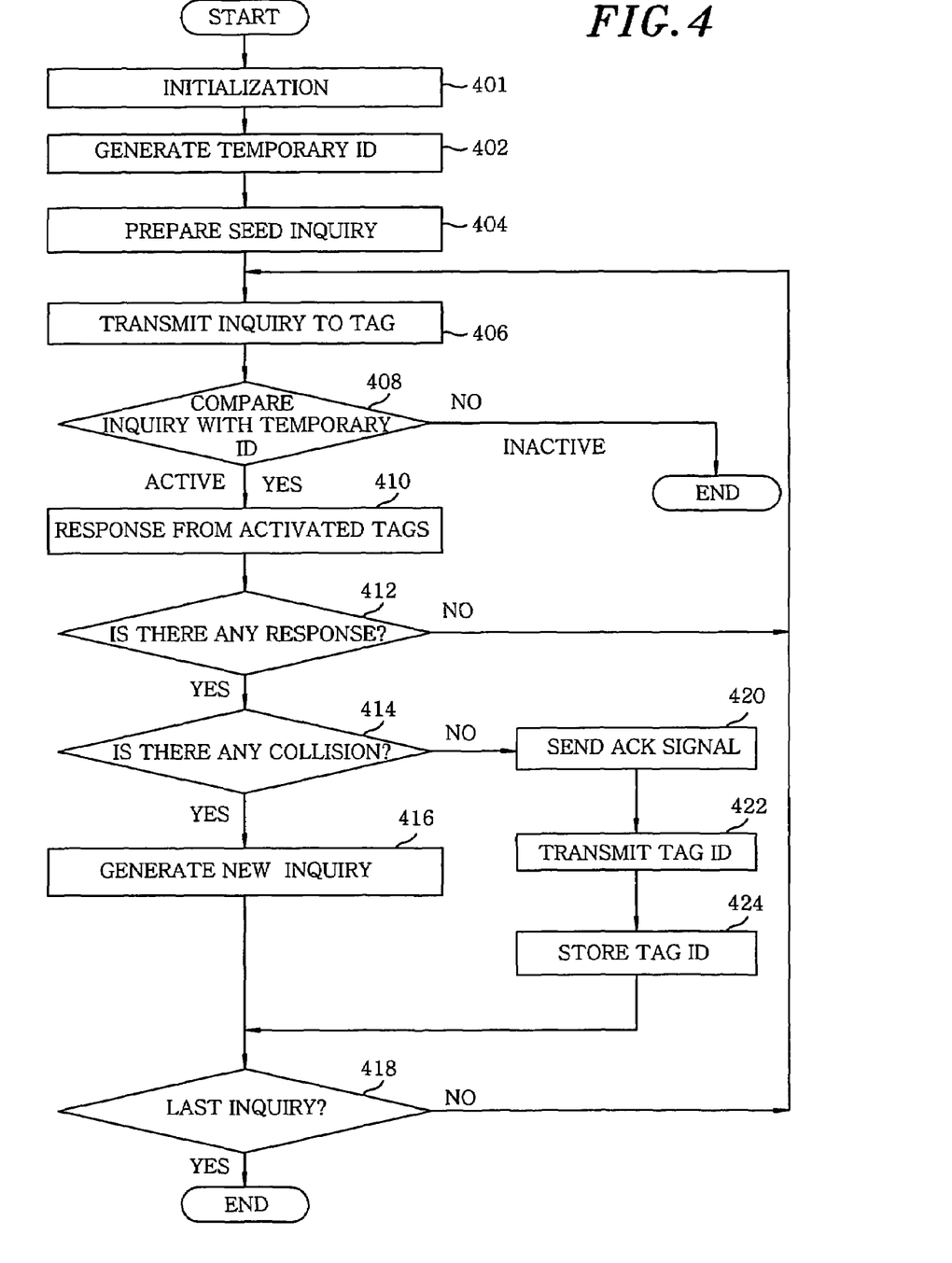
FIG. 4 illustrates a flow chart for describing a fast tag identification process by using the RFID tag anti-collision protocol of the present invention.

FIG. 4 illustrates a flow chart for describing a fast tag identification process by using the RFID tag anti-collision protocol of the present invention.

As shown in FIG. 4, the query tree based reservation used in the present invention are performed by generating temporary IDs, applying the query tree algorithm and transmitting ACK signals when identifying the temporary IDs. After that, the processes of applying the query tree algorithm and transmitting the ACK signals when identifying the temporary IDs are repeated. The ACK signal is used to receive at the reader a real tag ID from each tag which has been received its temporary ID.

More specifically, after initialization of the reader 10 (step 401), a first step is to generate temporary IDs for each tag 20. That is, each tag 20 generates a 16-bit temporary ID RN16 representing each tag (step 402). The generated temporary IDs are stored in the memory of the tags 20, respectively.

In this regard, the probability for a single specific temporary ID to be generated is expressed by the following equation 1.

$$0.8/2^{16} < P(RN16=j) < 1.25/2^{16} \qquad \text{Eq. 1}$$

Herein, j is an arbitrary number which may be generated by the random number generator. The probability that the uniqueness of the temporary ID generated by the probability as shown in the equation 1 is broken is less then 0.1%, while the probability of predicting the temporary ID is approximately 0.025%.

Meanwhile, a seed inquiry of n-bit is prepared in the reader 10 (step 404).

Next, a second step, which is to apply the tags 20 having generated the temporary IDs to the query tree algorithm, performs a request process (step 406), a response process (steps 408 to 410) and a decision process (steps 412 to 416).

In the request process, the reader 10 transmits the inquiry of n-bit to each of the tags 20 (step 406).

In the response process, each tag 20 compares the reader's n-bit inquiry with a first n-bit of its temporary ID to decide whether they are identical to with each other (step 408). If they are identical, the tag 20 is activated and thus, sends its temporary ID by one bit from (n+1)-bit to a last bit to the reader 10 as its response (step 410). However, if NO in step 408, each of the tags 20 wherein (n−1) bits are not identical with the inquiry is inactived.

In the decision process, if there is the tag's response (step 412), the reader 10 performs such operations as follows. First of all, the reader 10 determines whether there occurs any collision (step 414). Thereafter, the reader 10 performs subsequent processes with the following conditions depending on whether a collision occurs or not. In case that the collision occurs in the step 414, the reader 10 generates two new inquiries and stores them in its memory, e.g., LIFO (Last Input First Output) (step 416). The two new inquiries are formed by adding '0' and '1' to the inquiry.

In this connection, if the collision occurs when the tag 20 responds with only the last bit of its temporary ID, the reader 10 will identify two temporary IDs of two tags that the collision occurred. However, if there is no collision, the reader 10 will identify one temporary ID.

Next, the third step is to transmit an ACK signal in order receive the real tag IDs from the tags when one temporary ID is identified (step 420). If the reader 10 identifies one temporary ID, the reader 10 calls the tag 20 having the identified temporary ID to transmit its real ID by sending the ACK signal. In response to the ACK signal, the tag 20 transmits its real tag ID (step 422).

The real tag ID transmitted from the tag 20 is then stored in the memory of the reader 10, thereby completing the identification for a tag corresponding to the detected temporary ID (step 424).

Here, in order to enhance the performance when storing the status in the tags 20, a two-bit code which indicates the ACK signal is used to represent the status of ACK, whereas, in case of adding functions such as the security and the authentication, the ACK signal added with the received temporary ID can serves as a key for searching the real tag IDs and getting the information in the memory of each tag.

Finally, the fourth step is to repeat the second and the third steps until there is none of the inquiries in the LIFO as described in step 418.

Consequently, the reader 10 identifies all tags through the processes described above; and the tree depth causing the performance degradation of the query tree algorithm is reduced; and the throughput limitation of the ALOHA itself in EPC Class 1 Gen. 2 protocol can be overcome, resulting in a significantly improved performance.

Figure 5:
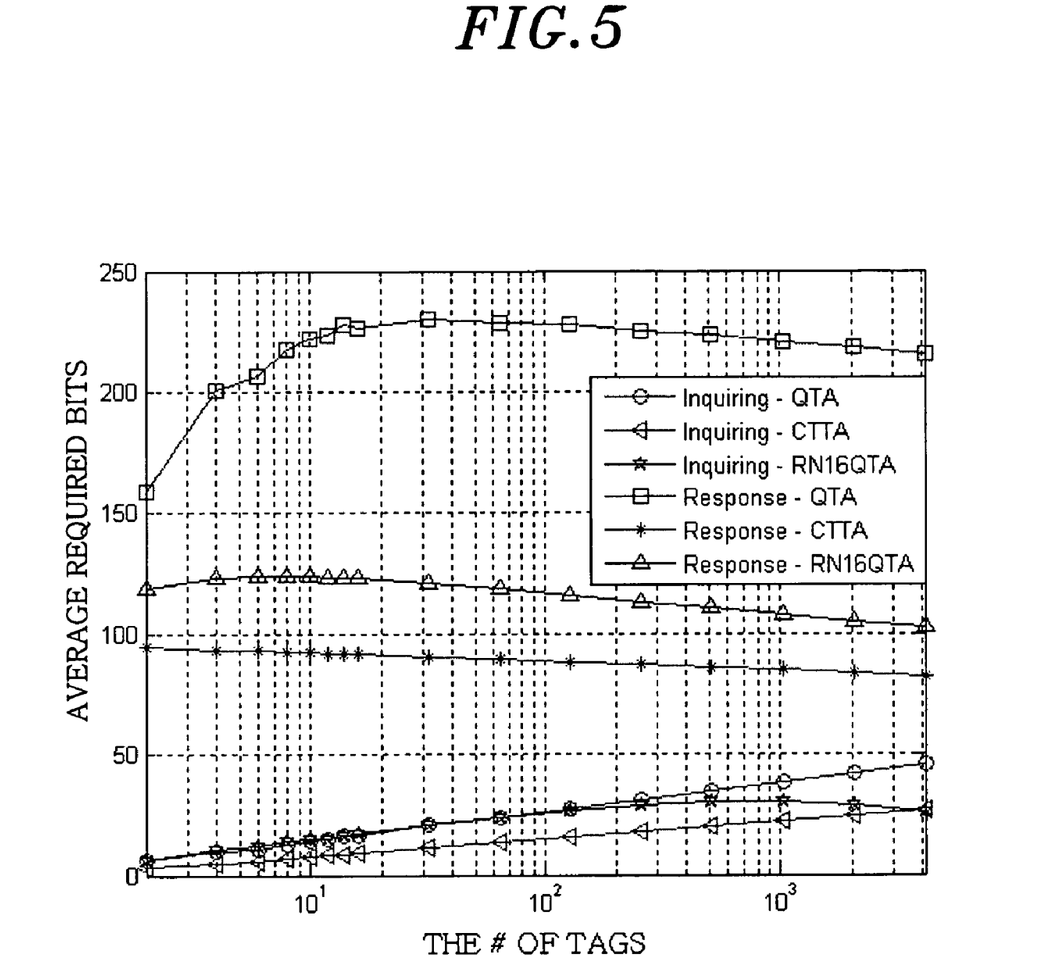
FIGS. 5 and 6 respectively describe the average required bits and iteration for the inquiry and the response of the reader and the tag in case of identifying one tag which has a 96-bit ID in accordance with the present invention.
Figure 6:
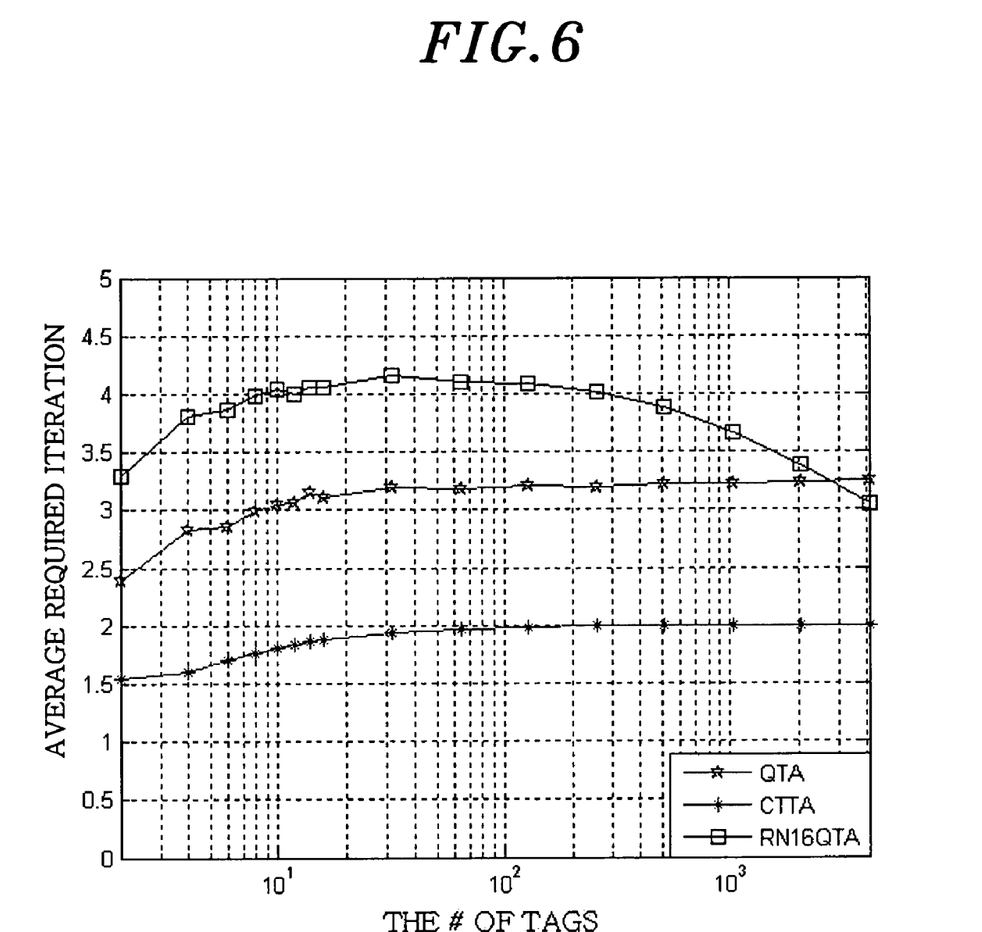
Figure 7:
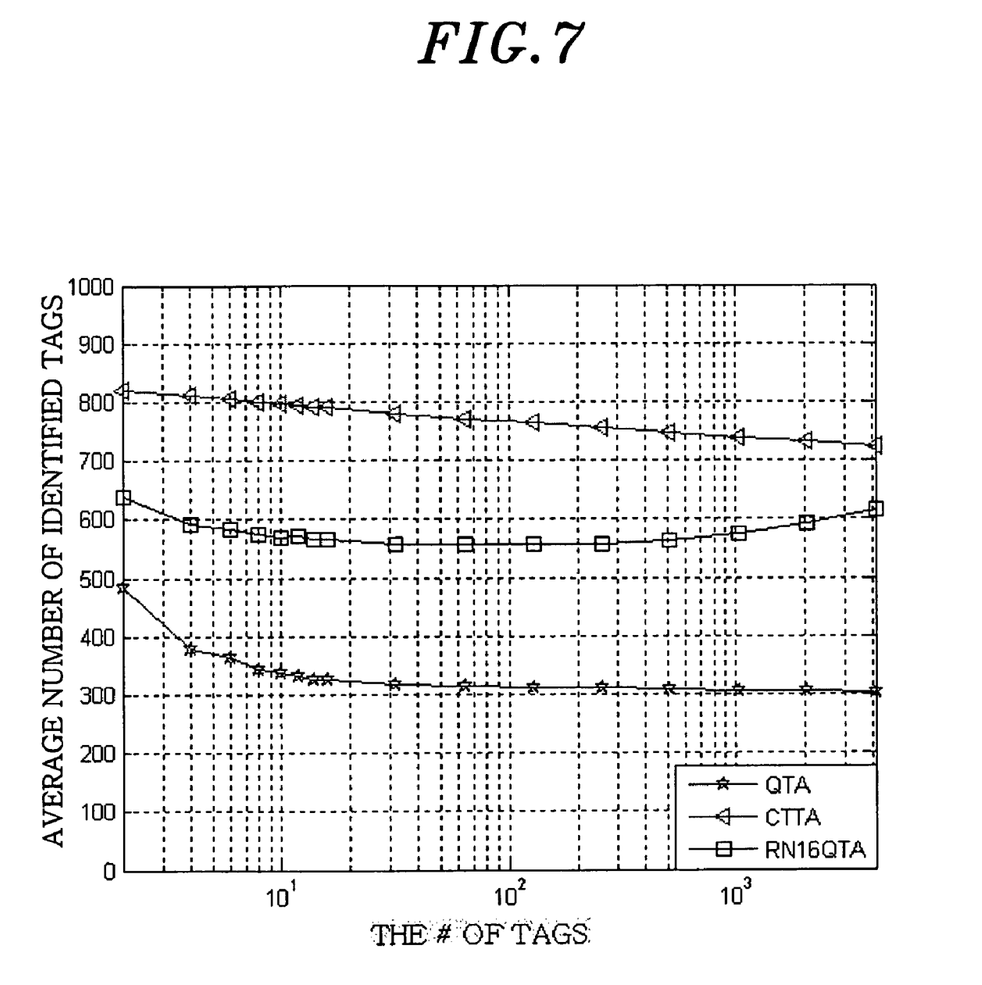
FIG. 7 shows the number of tags, each tag having a 96-bit ID and identified per unit time (second) by the reader when setting both the reader-to-tag data rate and the tag-to-reader date rate to be 80 kbps in accordance with the present invention.

FIGS. 5 and 6 respectively describe the average required bits and iteration for the inquiry and the response of the reader and the tag in case of identifying one tag which has a 96-bit ID in accordance with the present invention. FIG. 7 shows the number of tags, each of which has a 96-bit ID, identified per unit time (second) by the reader in case that both the reader-to-tag data rate and the tag-to-reader date rate are set to be 80 kbps in accordance with the present invention.

As illustrated in the drawings, the query tree based reservation provided in the present invention shows significantly improved performance compared to the conventional query tree algorithm and approaches the performance of the collision detection algorithm which can not be applied to the low-cost passive RFID systems. At this point, although the query tree based reservation proposed in the present invention requires one more iteration for the inquiry and the response than the conventional query tree algorithm because the process for re-receiving the tag ID after identifying the temporary ID is added, it is noted that the performance of the query tree based reservation in the present invention is much better that of the conventional query tree algorithm since the number of the bits required for each inquiry and response is ⅙ in the query tree based reservation of the present invention, which is extremely small.

Figure 8:
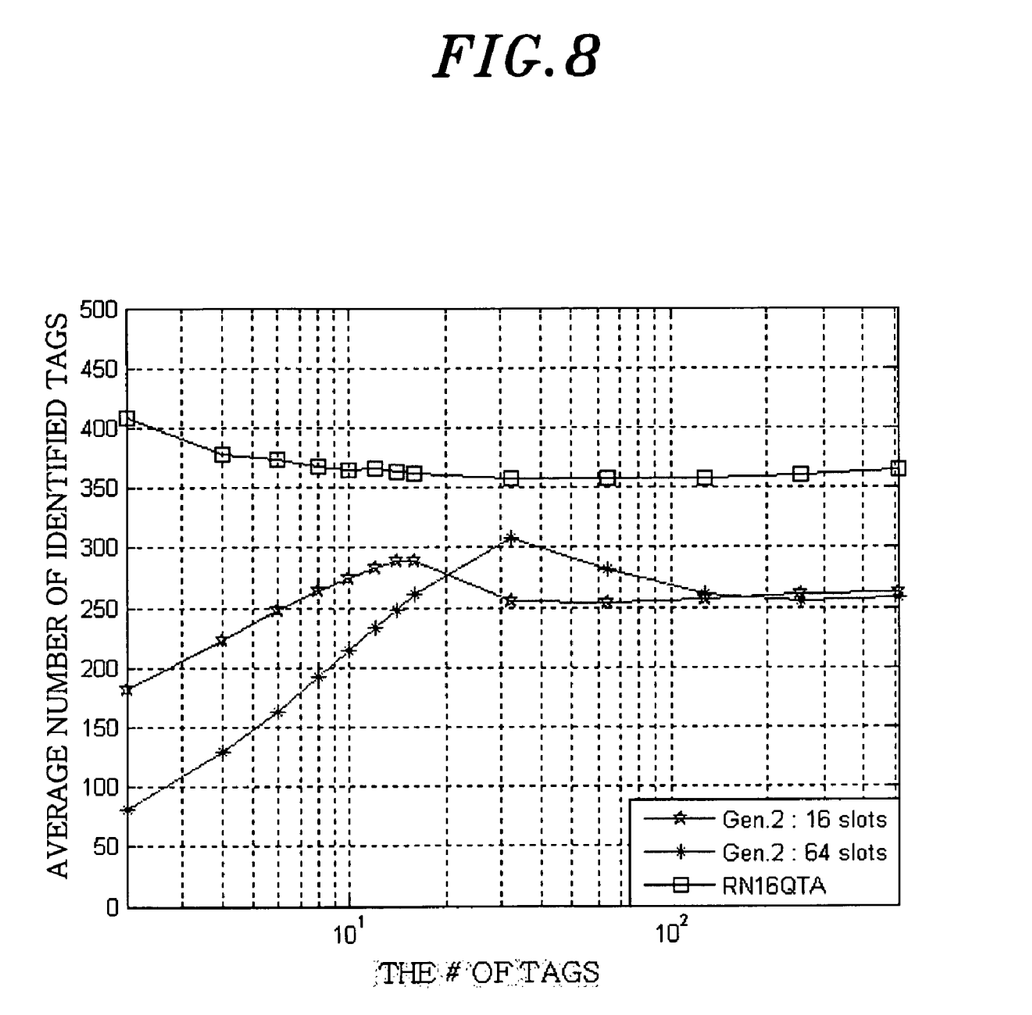
FIG. 8 shows comparison of the number of the tags, each tag having a 96-bit ID and identified per unit time (second) by the reader when setting the date rate to be 80 kbps in accordance with the present invention.

FIG. 8 shows comparison of the number of the tags, each of which has a 96-bit ID, identified per unit time (second) by the reader in case that the date rate is set to be 80 kbps in accordance with the present invention. That is, in terms of implementation, after constructing a simple system of EPC Class 1 Gen. 2 protocol and a system according to the query tree based tag identification method of the present invention without implementing a session part for preventing reader collisions and a security and authentication part, the number of tags which the reader identifies per unit time (second) between them is compared in case that both the reader-to-tag data rate and the tag-to-reader date rate are set to be 80 kbps, each tag having a 96-bit ID. Here, for the maximum performance of EPC class 1 Gen. 2 protocol, the time wasted by empty slots is not considered; and the default frame has a size of 16 slots or 64 slots.

As described in the drawings, the query tree based reservation proposed in the present invention shows superior performance to the EPC Class 1 Gen. 2 protocol even when the number of the tags and the default slot number of the frame are identical, which indicates the maximum performance of the EPC Class 1 Gen. 2. Furthermore, the query tree based reservation proposed in the present invention accomplishes more improved performance than the conventional tag anti-collision algorithms.

While the invention has been shown and described with respect to the preferred embodiments, it will be understood by those skilled in the art that various changes and modifications may be made without departing from the spirit and scope of the invention as defined in the following claims.

What is claimed is:

1. A tag identification method in REID systems including a reader and a plurality of tags, the method comprising the steps of:
    (a) forming a temporary ID for each of the tags;
    (b) comparing an inquiry of the reader with a portion of the temporary ID in each tag when receiving the inquiry from the reader;
    (c) if the inquiry and the portion of the temporary ID are identical to each other, transmitting a remainder of the temporary ID in each tag to the reader;
    (d) if a collision occurs in the step (c), generating new inquiries for storing them in the reader;
    (e) if there is no collision in the step (c), transmitting an ACK signal to each tag whose temporary ID is identified to receive its real tag ID therefrom; and
    (f) repeating the steps (b) to (e) until there is no inquiry in the reader,
    wherein, in step (d), in case the tag responds with only a last bit of its temporary ID after step (c), the reader identifies two temporary IDs if there is any collision.

2. The tag identification method in REID systems of claim 1, wherein the inquiry includes n-bit and the portion of the temporary ID includes first n-bit of the temporary ID.

3. The tag identification method in REID systems of claim 2, wherein the remainder of the temporary ID includes $(n+1)_{th}$ bit to last bit of the tag ID without the first n-bit.

4. The tag identification method in REID systems of claim 1, wherein the new inquiry includes two inquiries which are formed by adding '0' and '1' to the inquiry.

5. The tag identification method in REID systems of claim 1, wherein the ACK signal includes the code indicating the status of ACK.

6. The tag identification method in REID systems of claim 1, wherein the ACK signal is used for security and authentication and includes the status of ACK and the temporary ID added thereto.

7. The tag identification method in REID systems of claim 1, wherein the temporary ID includes 16-bit.

* * * * *